(12) United States Patent
Kanagae

(10) Patent No.: US 7,900,934 B2
(45) Date of Patent: *Mar. 8, 2011

(54) CARBON DIOXIDE GAS SEALING ENCLOSED DEVICE

(75) Inventor: Hidekazu Kanagae, Aso (JP)

(73) Assignee: NOK Corporation, Tokyo (JP)

( * ) Notice: Subject to any disclaimer, the term of this patent is extended or adjusted under 35 U.S.C. 154(b) by 374 days.

This patent is subject to a terminal disclaimer.

(21) Appl. No.: 12/084,889

(22) PCT Filed: Nov. 10, 2006

(86) PCT No.: PCT/JP2006/322439
§ 371 (c)(1),
(2), (4) Date: May 13, 2008

(87) PCT Pub. No.: WO2007/055307
PCT Pub. Date: May 18, 2007

(65) Prior Publication Data
US 2009/0045584 A1    Feb. 19, 2009

(30) Foreign Application Priority Data
Nov. 14, 2005   (JP) .................................. 2005-329032

(51) Int. Cl.
F16J 15/00  (2006.01)
F16J 15/02  (2006.01)
F16L 17/06  (2006.01)

(52) U.S. Cl. .......... 277/584; 277/611; 277/619; 277/638
(58) Field of Classification Search .................. 277/584, 277/589, 611, 619, 638, 639
See application file for complete search history.

(56) References Cited

U.S. PATENT DOCUMENTS
7,708,283 B2 *   5/2010   Azibert et al. ................ 277/370
2006/0232066 A1 * 10/2006   Kanagae et al. .............. 285/348

FOREIGN PATENT DOCUMENTS
JP        S46-4226       2/1971
JP        11-315925     11/1999
JP        2007303635 A *  11/2007

* cited by examiner

Primary Examiner — Vishal Patel
(74) Attorney, Agent, or Firm — Jacobson Holman PLLC

(57) ABSTRACT

To reduce a shaft insertion load and ensure a sealing function, a carbon dioxide gas sealing device has a seal ring provided in a mounting groove having a tapered groove bottom, a backup ring having a tapered portion corresponding to the tapered groove bottom, and a gap provided between the side wall surface at the low pressure side of the mounting groove and a side end surface at the lower pressure side of the backup ring, a tapered surface that approaches the peripheral surface of a housing from the side end surface on the high pressure side toward the lower pressure side is provided on the peripheral surface on the side opposite to the tapered portion and the tapered portion has two-stage tapers.

1 Claim, 7 Drawing Sheets

CARBON DIOXIDE GAS SEALING ENCLOSED DEVICE

This is a national stage of the International Application No. PCT/JP2006/322439 filed Nov. 10, 2006 and published in Japanese.

BACKGROUND OF THE INVENTION

1. Field of the Invention

The present invention relates to a sealing dioxide gas sealing device including a seal ring and a backup ring in a mounting groove to seal gas or the like of high-pressure fluid.

2. Description of the Conventional Art

A conventional carbon dioxide sealing enclosed device includes a seal ring such as an O-ring made of a rubber-like elastic body and a back up ring made of a resin or the like and positioned at a low pressure side of the seal ring in a mounting groove having a tapered groove bottom inclined in such the direction that a distance between the tapered groove bottom and a housing expands from a side end surface at a low pressure side provided on the shaft toward a high pressure side, to seal a part between a shaft hole formed at the housing and a shaft. In the conventional carbon dioxide sealing device, when pressure of fluid is applied from the high pressure side, the backup ring is pressed toward the low pressure side from the high pressure side through the seal ring. The backup ring has an inner peripheral surface formed with a tapered part, which corresponds to the tapered groove bottom of the mounting groove and is inclined in the same direction as that of the groove bottom. Further, the back up ring has an outer peripheral surface formed with a parallel surface which is parallel to an inner peripheral surface of the housing. When the inner peripheral surface of the backup ring contacts the tapered groove bottom of the mounting groove by pressure from the high pressure side, the outer peripheral surface of the backup ring tightly contacts to the inner peripheral surface of the housing by radial directional component force. Accordingly, a gap between the backup ring and the inner peripheral surface of the housing is closed so as to prevent protruding of the seal ring toward the low pressure side.

According to such the constitution, there is no problem when the sealing device is subjected to a general fluid pressure or an eccentricity of the shaft is small. However, when the device is subjected to high-pressure fluid or has an eccentricity of the shaft is large, a gap may be generated between an outer peripheral surface of a backup ring and an inner peripheral surface of a housing so as to protrude a seal ring toward a low pressure side. Therefore, Japanese Patent Application Laid Open No. 11-315925 proposes a device in which a gap g is provided between a side end surface 101a at a low pressure side L of a backup ring 101 and a side wall surface 102a at a low pressure side L of a mounting groove 102, as illustrated in FIG. 12.

Accordingly, when the device is subjected to high-pressure fluid, the backup ring 101 moves to the low pressure side L so as to generate radial directional component force. The radial directional component force reduces a gap between a tapered part of the backup ring 101 and the mounting groove 102 and a gap between an outer peripheral surface of the backup ring 101 and a housing 104. Further, according to this method, it has been found out in recent years that the backup ring 101 itself has an effect to seal gas which has permeated a seal ring made of a rubber-like elastic body, and has an effect to reduce leakage through gaps at inner and outer peripheral parts of a backup ring. Furthermore, in order to obtain an effect to reduce a gap leak, a technique that an outer diameter of a backup ring 101 is set to be equal to or larger than an inner diameter of a housing 104 so as to fit those has been considered.

However, as illustrated in FIG. 13, when an outer diameter of a backup ring 101 is set to be equal to or larger than an inner diameter of a housing 104, a side end surface 101b at a high pressure side H of the backup ring 101 contacts to a top end part 104A of a housing 104 at the time of inserting a shaft into the housing 104, so that a shaft insertion load increases. Further, since the shaft is inserted while the top end part 104A is contacted with the side end surface 101b, the backup ring 101 may be inclined and mounted in the state that inner and outer peripheral surfaces are not correctly in tight contact with opposite members. When being mounted in the above-described state, the backup ring 101 cannot realize the function of preventing protrusion of a seal ring 105, and the seal ring 105 is protruded toward a low pressure side when being subjected to high-pressure fluid, so that a device may be damaged. Further, an effect by a seal function of the backup ring 101 itself cannot be expected. Therefore, when the shaft is inserted while the top end part 104A is contacted with the side end surface 101b, a device cannot realize a seal function.

SUMMARY OF THE INVENTION

Problems to be Solved by the Invention

The present invention solves the above-described problems, and an objective of the present invention is to provide a carbon dioxide gas sealing enclosed device capable of reducing a shaft insertion load and ensuring the function of preventing protrusion of a seal ring toward a low pressure side and the sealing function of a seal ring even when being subjected to high-pressure fluid.

Means for Solving the Problems

In order to obtain the above-described objectives, according to a first aspect of the present invention a carbon dioxide gas sealing enclosed device, which is to seal a part between two members coaxially assembled, includes a seal ring made of a rubber-like elastic body and mounted in an annular mounting groove provided at one of the two members; a backup ring provided at a low pressure side in a width direction beyond the seal ring; a tapered part provided on a peripheral surface at a groove bottom side of the backup ring so as to incline in such direction that a distance between the peripheral surface of the backup ring and a peripheral surface of the other member is gradually reduced toward a low pressure side; a tapered groove bottom part provided on a groove bottom surface of the mounting groove so as to correspond to the tapered part of the backup ring; and a gap provided at a low pressure side of the backup ring in the mounting groove when a pressure is applied from a high pressure side, wherein the device further includes a tapered surface provided on a peripheral surface at the side opposite to the tapered part of the backup ring so as to approach a peripheral surface of the other member toward a low pressure side from a side end surface at a high pressure side.

Further, according to a second aspect of the present invention, the carbon dioxide gas sealing enclosed device recited in the first aspect includes a tapered part of the backup ring which has a two-stage taper formed with a high pressure side tapered part and a low pressure side tapered part having a larger inclination angle than that of the high pressure side tapered part.

Effectiveness of the Invention

The present invention has the following effects.

A carbon dioxide gas sealing enclosed device according to the first aspect of the present invention includes a tapered surface provided on a peripheral surface at the side opposite to the tapered part of the backup ring so as to approach a peripheral surface of the other member toward a low pressure side from a side end surface at a high pressure side. Thus, when one member is inserted, the other member is guided by the tapered surface without contacting to a side end surface at a high pressure side of the backup ring, so that the member can be accurately inserted while an insertion load being reduced. As a result of this, it can be prevented to decrease seal property due to faulty mounting of the backup ring. Further, when the device is subjected to high-pressure fluid, radial directional component force generated by moving of the backup ring in an axial direction is applied due to a gap being provided. The radial directional component force generates large compression force to eliminate a radial directional gap with the other member, where the gap is created due to the tapered surface being provided. That is, when a pressure is applied from a high pressure side, an outer peripheral surface and inner peripheral surface of the backup ring contact to respective opposite surfaces. However, since the gap is provided between a side wall surface at a low pressure side of the mounting groove and a side end surface at a low pressure side of the backup ring, the backup ring can move to a low pressure side as a high pressure being further applied thereafter. Accordingly, radial directional component force is generated so as to press further the outer surface and inner surface which have already contacted to the respective opposite surfaces. Therefore, the device has the function of preventing protrusion of a seal ring as in a conventional technique and the sealing function.

In addition, a carbon dioxide gas sealing enclosed device according to the second aspect of the present invention has the tapered part of the backup ring formed in a two-stage tapered shape having a high pressure side tapered part and a low pressure side tapered part. The low pressure side tapered part has a larger inclination angle than that of the high pressure side tapered part. Thus, when the other member is guided by a tapered surface so as to be inserted, reaction force in the radially inside direction of the backup ring is reduced, so that an insertion load can be more reduced. Further, when the device is subjected to high-pressure fluid from a high pressure side, a backup ring is applied with rotation force in a clockwise rotational direction, so that a surface pressure of a tapered part increases. Thus, seal property of the backup ring can be improved.

Since a backup ring is to prevent protrusion of a seal ring, a gap is not conventionally provided between a backup ring and a housing. Thus, a technique like the present application to positively change a shape of the device by providing a tapered surface so as to create a gap can not have been considered. However, in the present application, owing to a synergistic effect of high-pressure fluid and the gap at a shaft directional low pressure side, the gap becomes as small as possible when the device is subjected to high-pressure fluid, even though a tapered surface is provided, so that it becomes possible to keep "the function of preventing protrusion of a seal ring" and "the sealing function".

DETAILED DESCRIPTION OF PREFERRED EMBODIMENTS

Preferred embodiments of the present invention will be described below with reference to drawings. However, the present invention is not limited to the contents described in the embodiments if there is no limitative description.

Figure 1:
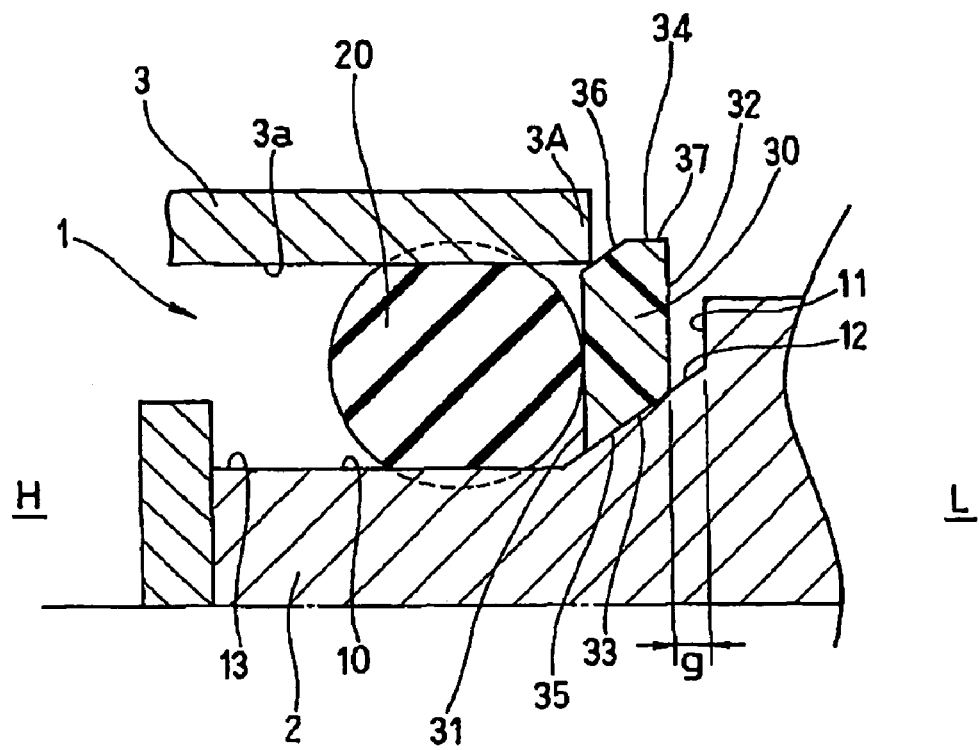
FIG. 1 is a structural explanation view of a sealing device according to embodiment 1 of the present invention.

FIG. 1 is a cross sectional view of main parts of a carbon dioxide sealing enclosed device according to embodiment 1 of the present invention. This carbon dioxide sealing enclosed device is mounted in an annular space between a shaft hole provided at a housing and a shaft inserted into an inner periphery of the shaft hole.

The carbon dioxide sealing enclosed device 1 includes a seal ring 20 mounted in a mounting groove 10 provided on an outer peripheral surface of shaft 2, and a backup ring 30.

The mounting groove 10 includes a tapered groove bottom part 12 inclined in such the direction that a distance between the tapered groove bottom part 12 and an inner peripheral surface 3a of a housing 3 expands from a side wall surface 11 at a low pressure side L toward a high pressure side H, and a parallel bottom surface 13 which is in parallel to an inner peripheral surface 3a of the housing 3 from an end part at a high pressure side H of the tapered groove bottom part 12 toward a high pressure side H.

A seal ring 20 is formed with a rubber-like elastic body, and is an O-ring having an approximately circular cross section in a free state. When the seal ring 20 is mounted in a mounting groove 10, the seal ring 20 is compressed in a radial direction by the inner peripheral surface 3a of the housing 3 and the parallel bottom surface 13 of the mounting groove 10 so as to be in an ellipse shape, and the high pressure side H and the low pressure side L are separated by reaction force of the compressed seal ring 20.

A backup ring 30 is made of a resin such as PTFE, or nylon or a compound material of these resins, and is in a cylindrical shape. Side end surfaces 31 and 32 are formed as surfaces which rectangularly cross the inner peripheral surface 3a of the housing 3 at both the high pressure side H and the low pressure side L. A predetermined gap g is provided between a low pressure side end surface 32 and a side wall surface 11 at the low pressure side L of the mounting groove 10. The size in a radial direction of the low pressure side end surface 32 of the backup ring 30 is set to be larger than a distance from the tapered groove bottom part 12 at the side wall surface 11 at the low pressure side L of the mounting groove 10 to the inner peripheral surface 3a of the housing 3. In addition, it is preferable to use nylon as a material which hardly permeates gas.

Further, an inner peripheral surface 33 of the backup ring 30 is formed with a tapered part 35, which opposites to the tapered groove bottom part 12 of the mounting groove 10, has an approximately same inclination angle as that of the tapered groove bottom part 12, and inclines in the same direction. An outer peripheral surface 34 includes tapered surface 36, which opposites to the inner peripheral surface 3a of the housing 3 and approaches the inner peripheral surface 3a of the housing 3 from the high pressure side end surface 31 toward the low pressure side L, and a parallel surface 37 which is in parallel to the inner peripheral surface 3a of the housing 3 from an end part at the low pressure side L of the tapered surface 36 toward the low pressure side L.

Figure 2:
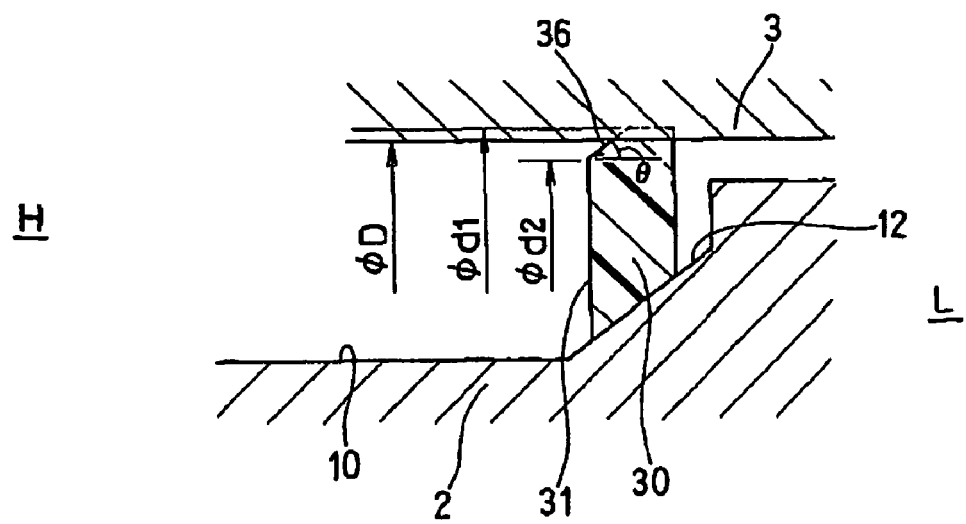
FIG. 2 is an explanation view to illustrate a size of a backup ring part in FIG. 1.

As illustrated in FIG. 2, it is proper that the tapered surface 36 of this embodiment 1 has a shape represented by the following formulas, where an inner diameter of the housing 3 is $\phi D$, an outer diameter of the backup ring 30 is $\phi d1$, and an outer diameter of an angle part at a high pressure side of the tapered surface 36 of the backup ring 30 is $\phi d2$.

$$0 \leq \phi d1 - \phi D \text{ and } 0 < \phi D - \phi d2 \leq 0.6$$

Preferably, $$0 \leq \phi d1 - \phi D \leq 0.3 \text{ and } 0 < \phi D - \phi d2 \leq 0.6$$

In addition, when a backup ring is otherwise mounted in a mounting groove provided at a housing, not like the embodiment of the present invention, the tapered surface 36 has a shape represented by the formula "Inner diameter of a backup ring≦Outer diameter of a shaft". Further, the inclination angle θ of the tapered surface is properly within the following range from view points of insertability.

$$5 \leq \theta \leq 30°$$

In the above-described structure, when a shaft 2 is inserted into the housing 3, a top end part 3A of the housing 3 contacts to the backup ring 30. However, since the backup ring 30 includes the tapered surface 36, the top end part 3A is guided by the tapered surface 36 without contacting to the high pressure side end surface 31 of the backup ring 30. Thus, the shaft 2 can be accurately inserted while an insertion load being reduced.

Further, since the top end part 3A of the housing 3 does not contact to the high pressure side end surface 31, it can be prevented to decrease sealing property by faulty setting of the backup ring 30.

Figure 3:
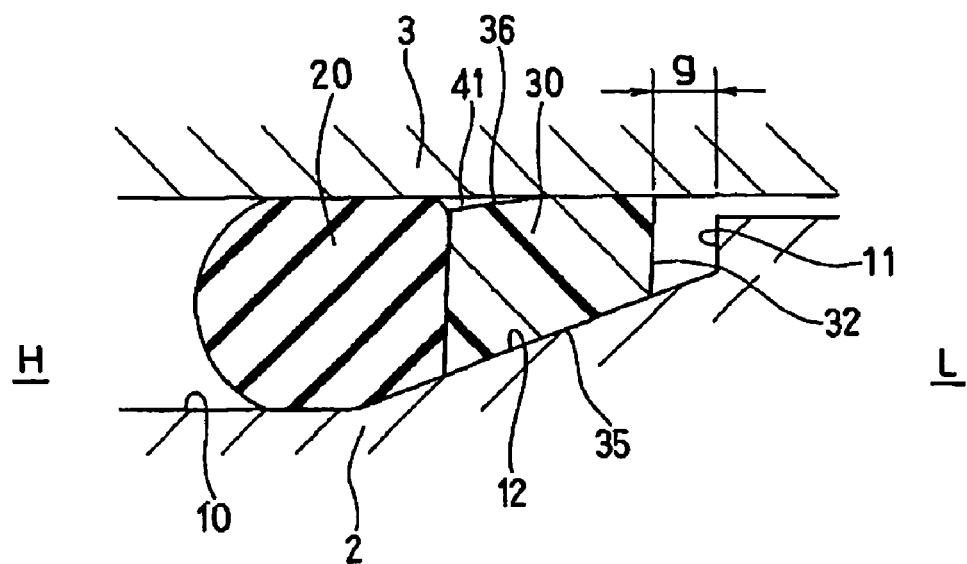
FIG. 3 is an explanation view to illustrate a state in which a pressure is applied while the device of embodiment 1 is mounted.
Figure 4:
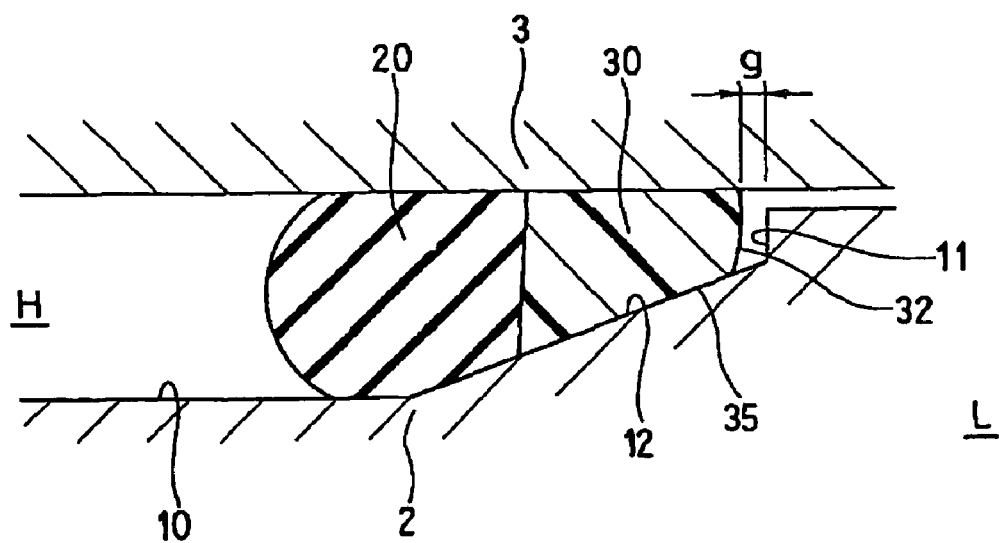
FIG. 4 is an explanation view to illustrate a state in which a pressure is applied while the device of embodiment 1 is mounted.

Furthermore, when the device is subjected to low-temperature and low-pressure fluid (25° C.×5 MPa) from the high pressure side H toward the low pressure side L, a radial directional gap 41 between the backup ring 30 and the housing 3 remains as illustrated in FIG. 3. However, since the fluid has a low pressure, the seal ring 20 is not protruded to a low pressure side L, and thus the seal ring 20 is not damaged. Further, when the device is subjected to high-temperature and high-pressure fluid (80° C.×15 MPa) radial directional component force generated by moving of the backup ring 30 in the axial direction is applied since the gap g is provided between a low pressure side end surface 32 of the backup ring 30 and the side wall surface 11 at the low pressure side L of the mounting groove 10. This radial directional component force generates as large compression force as to eliminate a radial directional gap between the backup ring 30 and the housing 3, which is created due to providing of the tapered surface 36, as illustrated in FIG. 4. Therefore, protrusion of the seal ring 20 to the low pressure side, and deterioration of sealing property caused due to damage of the seal ring 20 can be prevented. Further, gas permeated the seal ring 20 can be sealed, and leakage through gaps at inner and outer peripheral parts of the backup ring 30 can be reduced.

An insertion load of embodiment 1 was measured to compare with that of a conventional product. As a result of this, the load was a 5 to 10% level with respect to the conventional product, so that the load could be reduced by 90% or more comparing with the conventional product. Further, the device is subjected to high-pressure fluid under the conditions of (1) 5 MPa at an ordinary temperature and (2) 15 MPa at 80° C. after insertion of the shaft. As a result of this, it could be confirmed that the device could keep the function to prevent protrusion of an O-ring and the sealing function under the both conditions.

Figure 5:
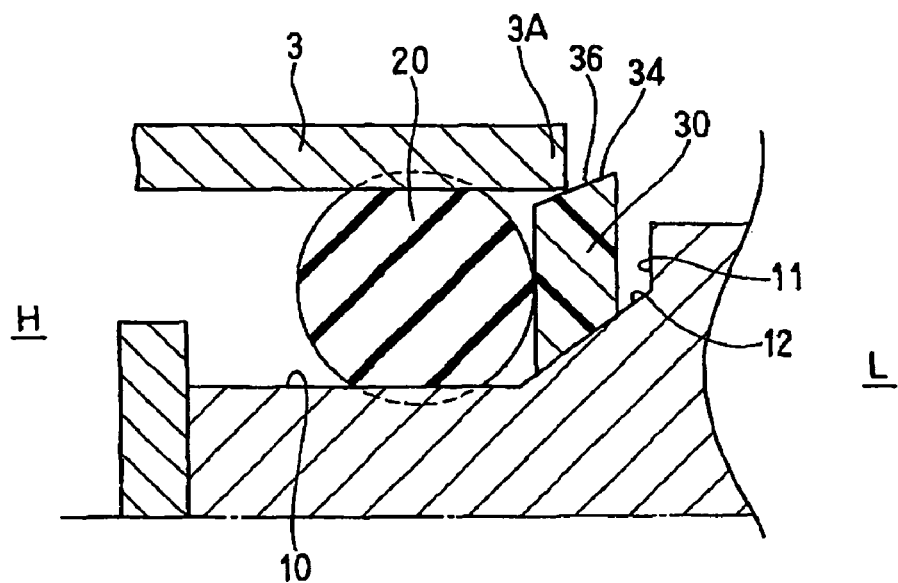
FIG. 5 is a structural explanation view of a sealing device according to embodiment 2 of the present invention.

In addition, this embodiment 1 discloses a case that the tapered surface 36 is formed at a part of the outer peripheral surface 34 of the backup ring 30. However, as illustrated in embodiment 2 of FIG. 5, the tapered surface 36 can be formed on the whole surface of an outer peripheral surface 34.

Figure 6:
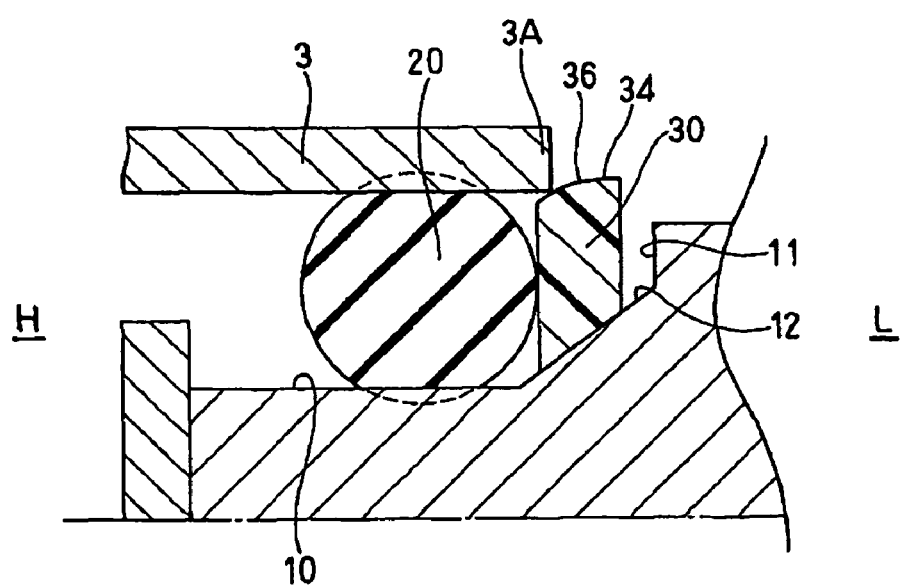
FIG. 6 is a structural explanation view of a sealing device according to embodiment 3 of the present invention.

Further, the tapered surface 36 can be not only an inclined plane surface but also an inclined curved surface as illustrated in embodiment 3 of FIG. 6. Of course, the inclined curved surface can be formed at a part of the outer peripheral surface 34 although this case is not illustrated.

Figure 7:
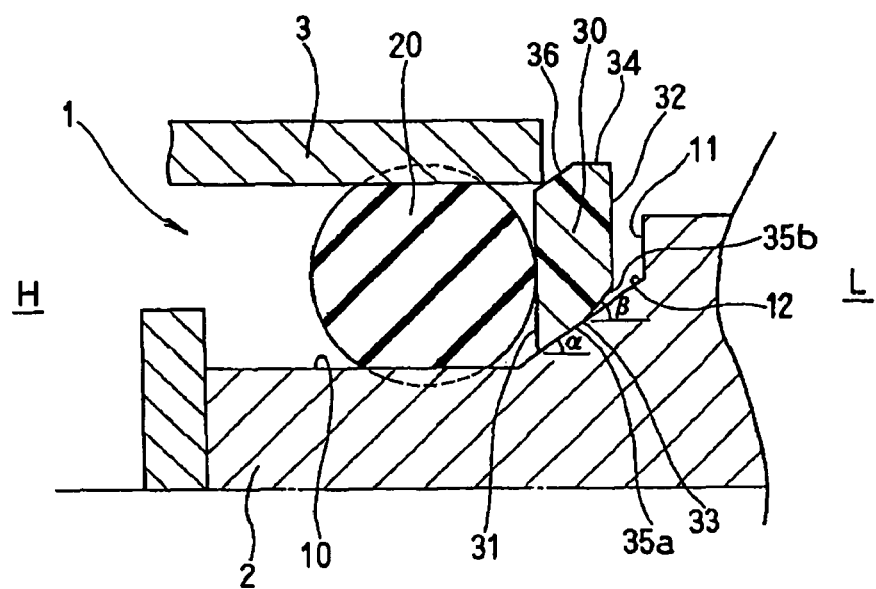
FIG. 7 is a structural explanation view of a sealing device according to embodiment 4 of the present invention.

Furthermore, in embodiment 4 illustrated in FIG. 7, an inner peripheral surface 33 of the backup ring 30 is formed as a two-stage tapered part with a high pressure side tapered part 35a having an inclination angle α which is approximately equal to an inclination angle of the tapered groove bottom part 12 of the mounting groove 10, and a low pressure side tapered part 35b having an inclination angle β which is larger than the inclination angle α of the high pressure side tapered part 35a.

Figure 8:
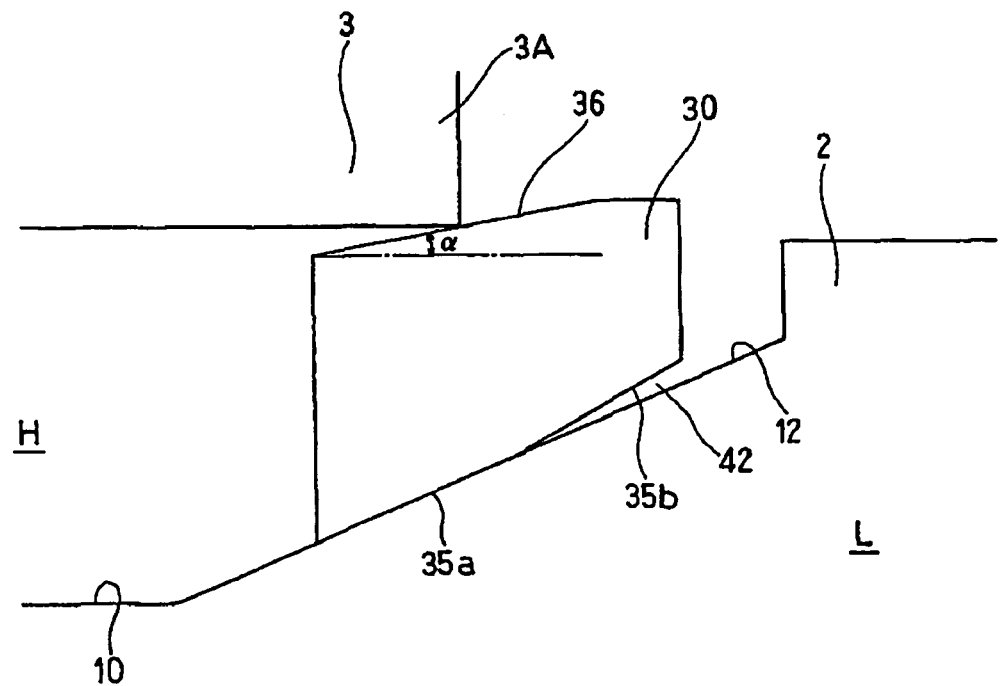
FIG. 8 is an explanation view to illustrate a state at the time of inserting a shaft in embodiment 4.
Figure 9:
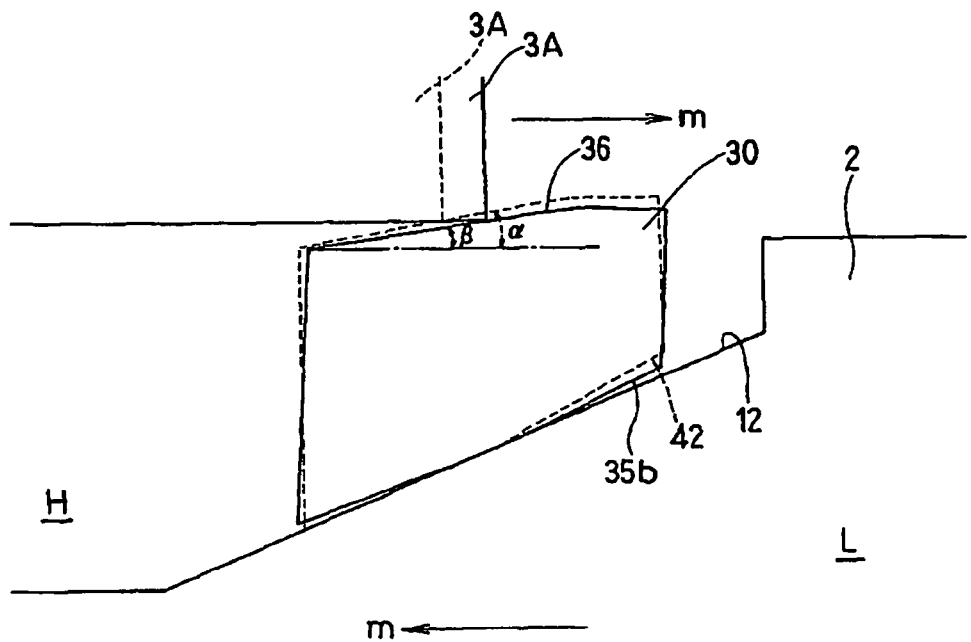
FIG. 9 is an explanation view to illustrate a state at the time of inserting a shaft in embodiment 4.

Therefore, in this embodiment 4, when the shaft 2 is inserted, the high pressure side tapered part 35a contacts to the tapered groove bottom part 12 as illustrated in FIG. 8, and thus a top end part 3A of a housing 3 is guided by a tapered surface 36 having the inclination angle α so as to move to the low pressure side L. As illustrated in FIG. 9, when the top end part 3A moves from a position shown with a broken line to a position shown with a solid line toward a low pressure side in an arrow m direction so as to increase an insertion load, the backup ring 30 is deformed so as to escape from the insertion load since a clearance 42 is exists between the low pressure side tapered part 35b and the tapered groove bottom part 12. That is, the backup ring 30 is deformed from a shape shown with a broken line to a shape shown with a solid line in FIG. 9. As a result of this, since the low pressure side tapered part 35b contacts to the tapered groove bottom part 12, the top end part 3A is guided by the tapered surface 36 having the smaller inclination angle β than an inclination angle α so as to move to the low pressure side L. Therefore, the insertion load can be more reduced than that in embodiment 1.

Under a condition that the collapse margin of the backup ring 30 when the backup ring 30 is fitted to the housing 3 is set to about 0.1 mm (Outer diameter of the backup ring 30—Inner diameter of the housing 3=about 0.2 mm), an insertion load of the shaft 2 in embodiment 4 is measured to compare with that of the above-described embodiment 1, as a result of which, the insertion load is a 25 to 30% level with respect to embodiment 1, and thus the insertion load can be reduced by about 75% comparing with embodiment 1.

Figure 10:
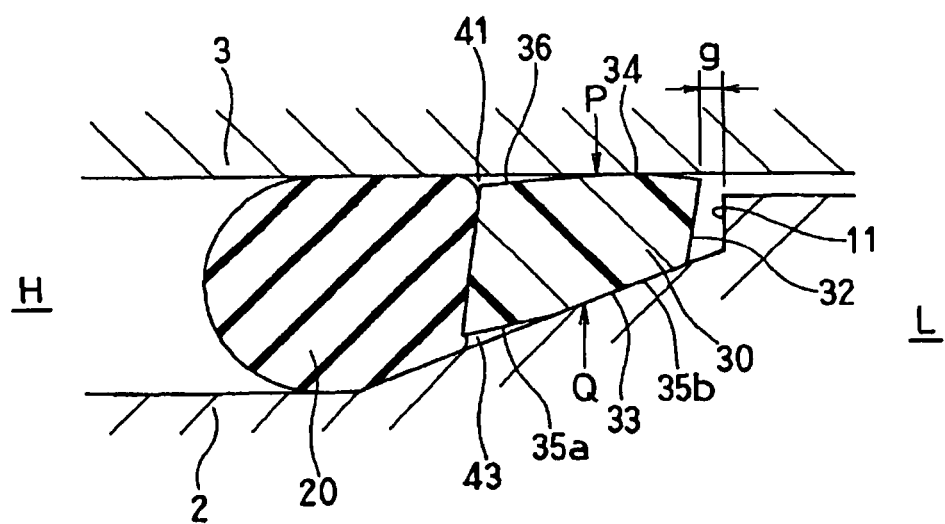
FIG. 10 is an explanation view to illustrate a state in which a pressure is applied while the device of embodiment 4 is mounted.
Figure 11:
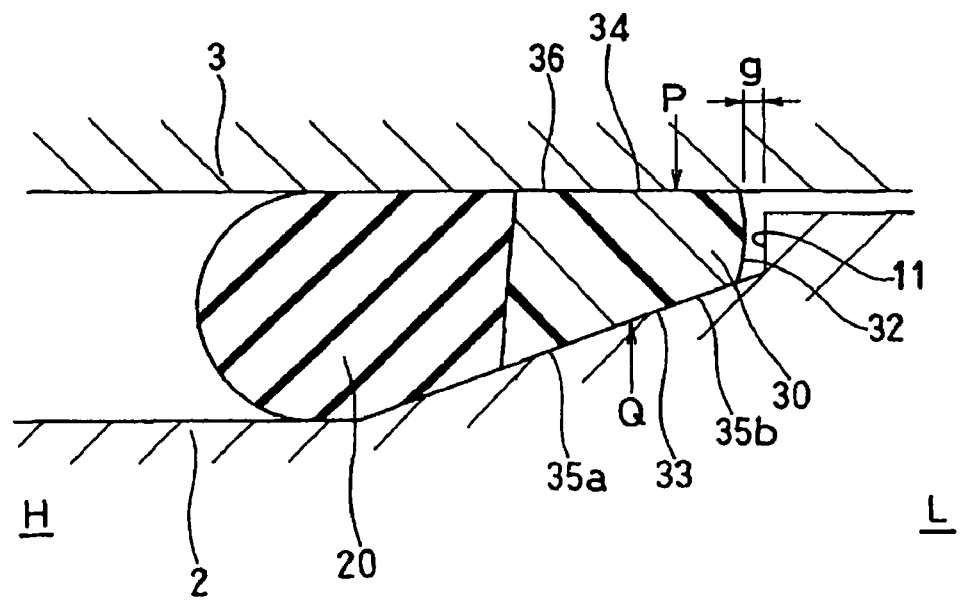
FIG. 11 is an explanation view to illustrate a state in which a pressure is applied while the device of embodiment 4 is mounted.
Figure 12:
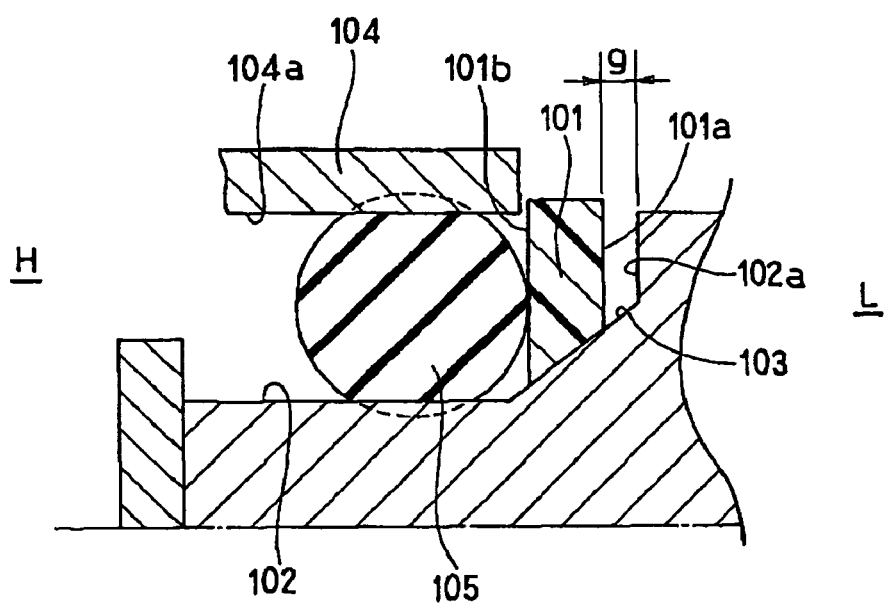
FIG. 12 is a structural explanation view of a sealing device according to a conventional example.
Figure 13:
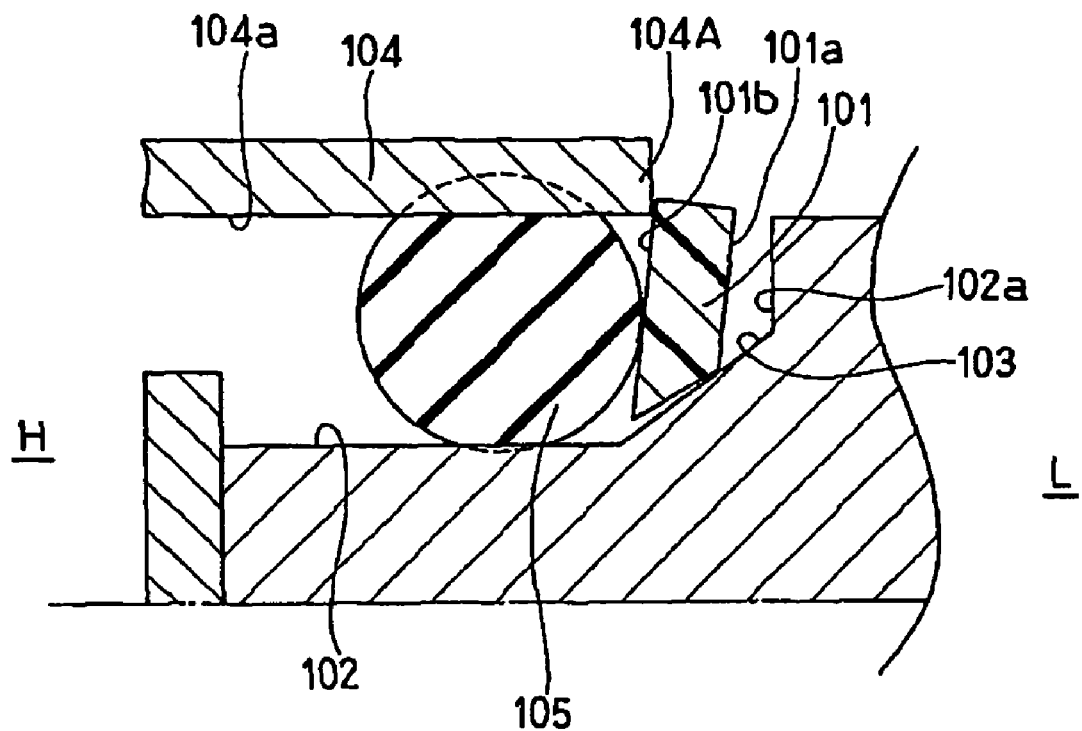
FIG. 13 is an explanation view to illustrate a state in which a conventional example has a problem.

Further, when the device is subjected to low-temperature and low-pressure fluid (25° C.×5 MPa) from the high pressure side H toward the low pressure side L, a radial directional gap 41 remains between the backup ring 30 and the housing 3 as illustrated in FIG. 10, and a radial directional gap 43 also remains between the backup ring 30 and the shaft 2. However, since the fluid has a low pressure, the seal ring 20 is not protruded to the low pressure side L, so that the seal ring 20 is not damaged. Furthermore, when the device is subjected to high-temperature and high-pressure fluid (80° C.×15 MPa), radial directional component force generated by moving of the backup ring 30 in the axial direction is applied since a gap g is provided between the low pressure side end surface 32 of the backup ring 30 and the side wall surface 11 at the low pressure side L of the mounting groove 10. Thus, the backup ring 30 is deformed so as to eliminate the radial direction gaps (41, 43) as illustrated in FIG. 11. Therefore, protrusion of the seal ring 20 to the low pressure side L and deterioration of sealing property by damaging of the seal ring 20 can be prevented.

Further, when the device is subjected to fluid from the high-pressure side H, since the tapered surface 36 is formed at a part of the outer peripheral surface 34 of the backup ring 20, the outer peripheral surface 34 has a changing point P, where inclination angle changes, at a boundary between a part with the tapered surface and a part without it. Similarly, the inner peripheral surface 33 has a changing point Q, where inclination angle changes, at a boundary between the high pressure side tapered part 35*a* and the low pressure side tapered part 35*b*. Therefore, since a large surface pressure is generated in the changing points (P, Q) where inclination angles change, gas sealing property (leakage through gaps) of the backup ring 30 can be improved.

In addition, the low pressure side tapered part 35*b* is an inclined plane surface in this example. However, the low pressure side tapered part 35*b* can be an inclined curved surface. In this case, the low pressure side tapered part 35*b* is formed in the state of having a gap between the low pressure side tapered part 35*b* and the tapered groove bottom part 12 of the mounting groove 10, when the high pressure side tapered part 35*a* contacts to the tapered groove bottom part 12 of the mounting groove 10 before insertion of the shaft.

Furthermore, the backup ring 30 can have a collapse margin which is compressed at the time of being fitted.

INDUSTRIAL APPLICABILITY

The present invention can be preferably used as a carbon dioxide sealing enclosed device including a seal ring and a backup ring in a mounting groove to seal gas or the like of high-pressure fluid.

What is claimed is:

1. A carbon dioxide gas sealing enclosed device to seal a part between two members coaxially assembled, the device comprising:
    a seal ring made of an elastomeric body and mounted in an annular mounting groove provided at one of the two members;
    a backup ring provided at a low pressure side in a width direction beyond the seal ring;
    a tapered part provided on a peripheral surface at a groove bottom side of the backup ring so as to incline in such direction that a distance between the peripheral surface of the backup ring and a peripheral surface of the other member is gradually reduced toward a low pressure side;
    a tapered groove bottom part provided on a groove bottom surface of the mounting groove so as to correspond to the tapered part of the backup ring; and
    a gap provided at a low pressure side of the backup ring in the mounting groove when a pressure is applied from a high pressure side, and
    a tapered surface provided on a peripheral surface at the side opposite to the tapered part of the backup ring so as to approach a peripheral surface of the other member toward a low pressure side from a side end surface at a high pressure side,
    the tapered part of the backup ring having a two-stage taper formed with a high pressure side tapered part and a low pressure side tapered part having a larger inclination angle than that of the high pressure side tapered part.

* * * * *